US007236796B2

(12) United States Patent
Soliman

(10) Patent No.: US 7,236,796 B2
(45) Date of Patent: *Jun. 26, 2007

(54) METHOD AND APPARATUS FOR REDUCING PILOT SEARCH TIMES UTILIZING MOBILE STATION LOCATION INFORMATION

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 10/353,303

(22) Filed: Jan. 28, 2003

(65) Prior Publication Data

US 2003/0114172 A1 Jun. 19, 2003

Related U.S. Application Data

(63) Continuation of application No. 09/387,102, filed on Aug. 31, 1999, now Pat. No. 6,542,743.

(51) Int. Cl.
    *H04Q 7/20* (2006.01)
(52) U.S. Cl. .............................. 455/456.1; 455/456.5; 455/422.1
(58) Field of Classification Search ................ 455/436, 455/422.1, 437, 440, 456.1, 456.2, 450, 456.5, 455/438, 404.2, 434, 515, 432.1; 370/310, 370/341, 329, 331, 332, 320
See application file for complete search history.

(56) References Cited

U.S. PATENT DOCUMENTS 4,901,307 A   2/1990  Gilhousen et al.
5,056,109 A  10/1991  Gilhousen et al.
5,101,501 A   3/1992  Gilhousen et al.
5,103,459 A   4/1992  Gilhousen et al.
5,109,390 A   4/1992  Gilhousen et al.
5,577,022 A  11/1996  Padovani et al.
5,627,835 A   5/1997  Witter
5,644,591 A   7/1997  Sutton (Continued)

FOREIGN PATENT DOCUMENTS

WO         9604716         2/1996

(Continued)

OTHER PUBLICATIONS

TIA/EIA Interim Standard "Mobile Station-Base Station Compatibility Standard for Dual-Mode Wideband Spread Spectrum Cellular System" pp. 6-78, 6-79, 6-88, 6-89, 6-90, 6-171-173, 7-76, 7-77, 7-100-107, 7-183, 7-184, 7-199-204 (May 1995).

*Primary Examiner*—Sonny Trinh
(74) *Attorney, Agent, or Firm*—Thomas R. Rouse; Charles Brown; Kam T. Tam

(57) ABSTRACT

A method and apparatus for conducting a pilot signal search in a wireless communications network. The location of a mobile is determined within the network. This location is then used in determining search window sizes and other search parameter information that is used to search all pilot signals identified in a designated pilot signal set. Search window size is also determined based upon the location of the mobile and another component related to multipath effects for a transmitted pilot signal.

11 Claims, 5 Drawing Sheets

U.S. PATENT DOCUMENTS

| | | |
|---|---|---|
| 5,726,982 A * | 3/1998 | Witter ............... 370/335 |
| 5,781,541 A | 7/1998 | Schneider |
| 5,781,543 A | 7/1998 | Ault et al. |
| 5,790,589 A * | 8/1998 | Hutchison et al. ......... 375/149 |
| 5,805,648 A | 9/1998 | Sutton |
| 5,995,827 A | 11/1999 | Broderick |
| 5,999,816 A | 12/1999 | Tiedemann et al. |
| 6,044,104 A | 3/2000 | Watanabe |
| 6,144,649 A | 11/2000 | Storm et al. |
| 6,157,820 A | 12/2000 | Sourour et al. |
| 6,160,799 A | 12/2000 | Krause et al. |
| 6,188,354 B1 | 2/2001 | Soliman et al. |
| 6,191,738 B1 * | 2/2001 | Pfeil et al. ............... 342/457 |
| 6,236,365 B1 * | 5/2001 | LeBlanc et al. ........... 342/457 |
| 6,275,186 B1 | 8/2001 | Kong |
| 6,278,703 B1 * | 8/2001 | Neufeld ............... 370/342 |
| 6,292,660 B1 | 9/2001 | Hartless et al. |
| 6,445,728 B1 * | 9/2002 | Byun ............... 375/142 |
| 6,466,606 B1 | 10/2002 | Jou |
| 6,490,313 B1 * | 12/2002 | Ganesh et al. ............. 375/130 |
| 6,542,743 B1 * | 4/2003 | Soliman ............... 455/436 |
| 6,714,785 B1 * | 3/2004 | Han ............... 455/440 |
| 2003/0222819 A1 * | 12/2003 | Karr et al. ............... 342/457 |

FOREIGN PATENT DOCUMENTS

| | | | |
|---|---|---|---|
| WO | WO 96/04716 | * | 2/1996 |
| WO | 9923847 | | 5/1999 |
| WO | WO 99/23847 | * | 5/1999 |
| WO | 9927657 | | 6/1999 |

* cited by examiner

METHOD AND APPARATUS FOR REDUCING PILOT SEARCH TIMES UTILIZING MOBILE STATION LOCATION INFORMATION

This is a continuation of a copending application having Ser. No. 09/387,102, filed Aug. 31, 1999, now U.S. Pat. No. 6,542,743.

BACKGROUND OF THE INVENTION

1. Field of the Invention

The present invention relates to communications. More particularly, the invention concerns a method and apparatus for reducing search times associated with the handoff of a call from one base station to another base station.

2. Description of the Background Art

Wireless communication systems generally comprise, amongst other elements, a wireless unit, commonly referred to as a mobile telephone (mobile), that communicates with one or more base stations when making a call. The mobile communicates with the base stations on one or more channels that are contained within a frequency band assigned to the mobile by a base station controller. A communication from the mobile to a base station is made on what is called the "reverse link," and a communication from the base station to the mobile station is made on the "forward link." During a call, the mobile station is constantly searching for other base stations that the mobile might need to continue the call while the mobile station is moving around.

One important element of a mobile used in such a wireless system is the searcher. The searcher is programmed to search for pilot signals (pilots) transmitted from different bases stations in at least three cases: 1) when a mobile is trying to acquire a base station for communication; 2) in the idle state when the mobile is on the paging or access channels; and 3) in the traffic state where the mobile is in control of the traffic channel. The speed of searching the pilots on the frequency assigned to the mobile and other frequencies determines the search performance of the mobile. In slotted mode, the objective is to search all pilots in the neighbor set before the slot expires. Slotted mode refers to an operation mode of the mobile where the mobile monitors only during selected slots of time. Also, when searching pilots in a "candidate" frequency, the mobile needs to complete its search of all pilots in the candidate set as quickly as possible so that it tunes back to the serving frequency and minimizes the voice degradation caused by searching the candidate frequency. As discussed below, the candidate frequency is a potential handoff frequency, and these searching techniques are used to coordinate handoffs of communications in the wireless communication system.

A. Handoffs

A mobile used in a code-division-multiple-access (CDMA) wireless system supports three types of handoff procedures when the mobile is in control of the traffic channel. The use of CDMA techniques in a multiple access communication system is disclosed in U.S. Pat. No. 4,901,307, issued Feb. 13, 1990 and entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein. The three types of handoffs are:

1. Soft Handoff—A handoff in which the mobile commences communications with a new base station without interrupting communications with the old base station. Soft handoff can only be used between CDMA channels having identical frequency assignments.
2. CDMA to CDMA Hard Handoff—A handoff in which the mobile is transitioned between disjoint sets of base stations, different band classes, different frequency assignments, or different frame offsets.
3. CDMA to Analog Handoff—A handoff in which the mobile is directed from a cdma forward traffic channel to an analog voice channel.

To perform soft handoff, the mobile continuously searches for assigned sets of pilots. The term "pilot" refers to a pilot channel identified by a pilot sequence offset and a frequency assignment. A pilot is associated with the forward link traffic channels in the same forward link CDMA channel, or similarly with the reverse link on systems using reverse link pilots. All pilots in a pilot set have the same CDMA frequency assignment. For clarity, pilots are discussed in terms of the forward link only.

The mobile searches for pilots on the current CDMA frequency assignment to detect the presence of CDMA channels and to measure their signal strength. When the mobile detects a pilot of sufficient strength that is not associated with any of the forward link traffic channels already assigned to it, it sends a pilot strength measurement message to the base station with which it is currently communicating. The base station can then assign a forward link traffic channel associated with that pilot to the mobile and direct the mobile to perform a handoff.

The pilot search parameters and the rules for pilot strength measurement message transmission are expressed in terms of the following sets of pilots:

Active Set: The pilots associated with the Forward Link Traffic Channels assigned to the mobile.

Candidate Set: The pilots that are not currently in the Active Set but have been received by the mobile with sufficient strength to indicate that the associated Forward Link Traffic Channels could be successfully demodulated.

Neighbor Set: The pilots that are not currently in the Active Set or the Candidate Set and are likely candidates for handoff.

Remaining Set: The set of all possible pilots in the current system on the current CDMA frequency assignment, excluding the pilots in the Neighbor Set, the Candidate Set, and the Active Set. This set of possible pilots consists of pilots whose pilot PN sequence offset indices are integer multiples of some pilot increment.

The base station may direct the mobile to search for pilots on a different CDMA frequency to detect the presence of CDMA channels and to measure their strengths. The mobile reports the results of the search to the base station. Depending upon the pilot strength measurements, the base station can direct the mobile to perform an inter-frequency hard handoff.

The pilot search parameters are expressed in terms of the following sets of pilots:

Candidate Frequency Neighbor Set: A list of pilots on the CDMA Candidate Frequency.

Candidate Frequency Search Set: A subset of the Candidate Frequency Neighbor Set that the base station may direct the mobile to search.

B. Pilot Search

In current systems, the base station sets the search window, that is, the range of PN offsets, in which the mobile is to search for usable multipath components. These multipath components are used by the mobile for demodulation of an associated forward link traffic channel. Search performance criteria, and general wireless system criteria, are defined in standards TIA/EIA-95x and TIA/EIA-98-B, all issued by the Telecommunications Industry Association, and ANSI J-STD-018, issued by the American National Standards Institute, all of which are incorporated by reference herein. These searches are generally governed by the following:

Active Set and Candidate Set: The search procedures for pilots in the active and candidate sets are identical. The search window size for each pilot in the active and candidate sets is the number of PN chips specified in Table 1 corresponding to SRCH_WIN_A. For example, SRCH_WIN_$A_S$=6 corresponds to a 28 PN chip search window or ±14 PN chips around the search window center. The mobile station centers the search window for each pilot of the active and candidate sets around the earliest arriving usable multipath component of the pilot.

TABLE 1

| SRCH_WIN_A SRCH_WIN_N SRCH_WIN_NGHBR SRCH_WIN_R CF_SRCH_WIN_N | Window Size (PN Chips) | SRCH_WIN_A SRCH_WIN_N SRCH_WIN_NGHBR SRCH_WIN_R CF_SRCH_WIN_N | Window Size (PN Chips) |
|---|---|---|---|
| 0 | 4 | 8 | 60 |
| 1 | 6 | 9 | 80 |
| 2 | 8 | 10 | 100 |
| 3 | 10 | 11 | 130 |
| 4 | 14 | 12 | 160 |
| 5 | 20 | 13 | 226 |
| 6 | 28 | 14 | 320 |
| 7 | 40 | 15 | 452 |

Neighbor Set: If a flag for a different neighbor search window is set, the search window size for each pilot in the neighbor set is the number of PN chips specified in Table 1, corresponding to search window size parameter associated with the pilot being searched. If the flag is not set, the search window size for each pilot in the neighbor set is the same and is equal to the number of PN chips specified in Table 1 corresponding to SRCH_WIN_$N_S$. The mobile centers the search window for each pilot in the neighbor set around the pilot's PN sequence offset, using timing defined by the mobile's time reference.

Remaining Set: The search window size for each pilot in the remaining set is the number of PN chips specified in Table 1 corresponding to SRCH_WIN_$R_S$. The mobile centers the search window for each pilot in the remaining set around the pilot's PN sequence offset, using timing defined by the mobile's time reference. The mobile searches for remaining set pilots whose pilot PN sequence offset indices are equal to integer multiples of the pilot increment.

Candidate Frequency Search Set: If the flag for candidate frequency is set, the search window size for each pilot in the candidate frequency search shall be the number of PN chips specified in Table 1, corresponding to SRCH_WIN_NGHBR associated with the pilot being searched. If the flag is not set, the search window size for each pilot in the candidate frequency search set shall be the number of PN chips specified in Table 1 corresponding to CF_SRCH_WIN_N. The mobile centers the search window for each pilot in the Candidate Frequency Search Set around the pilot's PN sequence offset using timing defined by the mobile's time reference.

C. Time to Search

Each phone manufacturer has its own way of implementing a search strategy. In all strategies, the time to search a specific pilot depends on the window size and the hardware of the searcher. Given certain hardware, the time to search a pilot is linearly proportional to the search window size. Reducing the search window size will result in a substantial reduction in searching time. Using current searching procedures, the window sizes are mostly determined by the size of the coverage area of a given cell. A cell is the geographical area covered by a base station for communication with a mobile. Four such cells are shown in FIG. 1. Regardless of the location of the mobile in the serving cell, current search windows are sized to correspond to the worst case scenarios. That is, they are sized to correspond to a mobile located at the greatest distance from the base station but within the cell. On the paging or traffic channels, the mobile centers its search window for each pilot in the neighbor set around the pilot's PN sequence offset, using timing established by the mobile's time reference. The mobile's time reference is defined as the earliest arrived and usable path. The worst case scenario determines the search window size. For example, FIG. 1 shows four adjacent cells 102, 104, 106, and 108 in a wireless system 100, each having a pilot designated PN1, PN2, PN3, and PN4, respectively. The search window size for pilot PN1 is determined based on a mobile located at point A. However, the same search window is used even if the mobile is at point B. This results in a waste of valuable searcher resources since it does not consider the location of the mobile within cell 104. If the mobile is at point B, the search window should be reduced in size relative to the search window required for a mobile located at point A.

D. Location Methods

Many techniques are being considered to provide for automatic location capability for mobiles. One technique involves measuring the time difference of arrival of signals from a number of cell sites. These signals are "triangulated" to extract location information. This technique requires a high concentration of cell sites and/or an increase in the transmission power of the sites to be effective because typical CDMA systems require each mobile to transmit with only enough signal power to reach the closest cell site. This triangulation requires communication with at least three sites, requiring an increase in the concentration of cell sites or the signal power of each mobile station would have to be increased. Another approach involves the addition of GPS (Global Positioning System) functionality to a mobile. This approach requires a line-of-sight to four satellites, is somewhat slow, but is the most accurate approach for locating a mobile.

A third approach sends aiding information to the mobile indicating in which frequency range the mobile should look for a GPS carrier. Most GPS receivers use what is known as a GPS satellite almanac to minimize a search performed by the receiver in the frequency domain for a signal from a visible satellite. The almanac is a 15,000 bit block of coarse ephemeris and time model data for the entire constellation. The information in the almanac regarding the position of the satellite and the current time of day is approximate only. Without an almanac, the GPS receiver must conduct the widest possible frequency search to acquire a satellite signal. Additional processing is required to attain additional information that will aid in acquiring other satellites. The signal acquisition process can take several minutes due to the large number of frequency bins that need to be searched. Each frequency bin has a center frequency and predefined width. The availability of the almanac reduces the uncertainty in satellite Doppler and therefore the number of bins that must be searched. The satellite almanac can be extracted from the GPS navigation message or sent on the down forward link from the satellite to the mobile as a data or signaling message. On receipt of this information, the mobile performs GPS signal processing to determine its location.

What is needed is a method and apparatus can use the location information for a mobile in conjunction with pilot search techniques to improve the speed by which a mobile can search all pilots on an assigned frequency while the mobile is in control of the traffic channel. The invention should be able to utilize information about the physical location of the mobile to determine the search window size for each pilot in the neighbor and candidate sets.

SUMMARY OF THE INVENTION

Broadly, the invention relates to a communication network. More specifically, the invention relates to an apparatus and method that utilizes the position of a mobile in determining the search window size for a pilot in the neighbor and active candidate sets.

One embodiment of the invention provides a method for conducting a pilot signal search in a wireless communications network. First, the location of a mobile is determined within the network. This location is then used in determining search window sizes and search parameter information used to search all pilots identified in a pilot set. Search window size is also determined based upon the location of the mobile and another component related to multipath effects for a transmitted pilot signal.

In another embodiment, the invention provides an article of manufacture containing digital information executable by a digital signal processing unit and used to conduct a pilot signal search in a wireless communications network. In another embodiment, the invention yields an apparatus used to conduct the pilot signal search. In one embodiment, the apparatus comprises at least one base station, wherein each base station transmits a pilot signal, and wherein the base station is used to determine the location of a mobile within the communications network. The apparatus may also include at least one mobile, wherein a mobile is communicatively coupled with at least one base station, and wherein the mobile uses search window sizes and other search parameter information transmitted to it to minimize the search time required for searching all pilot signals associated with a selected pilot set.

The invention provides its users with numerous advantages. One advantage is that the time required to search a set of pilot signals is reduced over known techniques. Another advantage is that valuable searcher resources are not wasted because a more efficient search may be conducted. The invention also provides a number of other advantages and benefits that should become apparent after reviewing the following detailed description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF EXEMPLARY EMBODIMENTS

Figure 1:
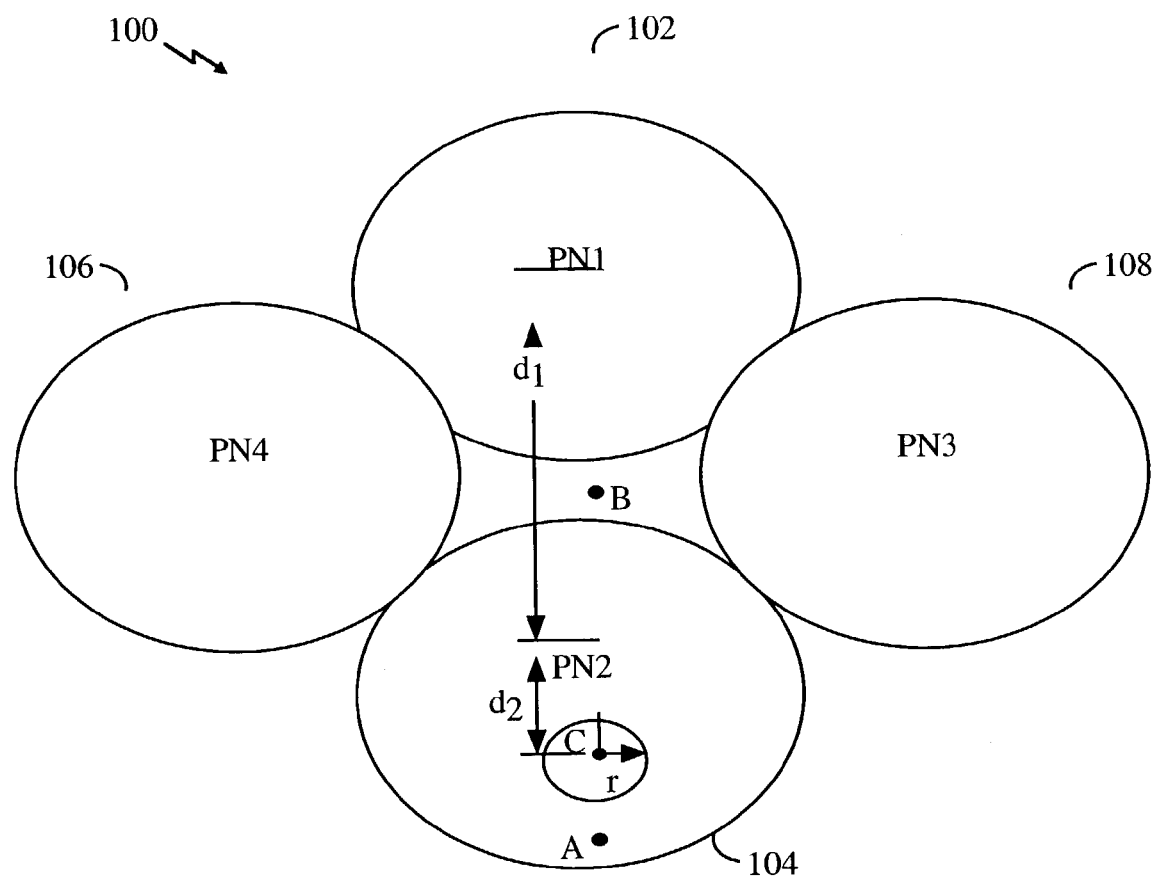
FIG. 1 shows four adjacent cells in a wireless communication system in accordance with the invention.

FIGS. 2a–4 illustrate examples of various method and apparatus aspects of the present invention. For ease of explanation, but without any limitation intended, these examples are described in the context of a digital signal processing apparatus. The digital signal processing apparatus used to execute a sequence of machine-readable instructions as referred to above may be embodied by various hardware components and interconnections. Various arrangements for these digital signal-processing apparatuses will become apparent to anyone schooled in the art after reading the below description of the methods involved.

Operation

The aforementioned patents and publications all describe a pilot signal used for acquisition. The use of a pilot signal enables the mobile to acquire a local base station in a timely manner. The mobile gets synchronization information, including a psuedorandom noise (PN) code phase offset, and relative signal power information from a received pilot signal carried on a pilot channel. Once a pilot channel has been acquired, the mobile may also acquire a synchronization channel (sync channel) that is associated with the pilot channel. The sync channel is used to receive fine-tuning of its timing instructions and thereby permit the mobile to temporally synchronize its internal circuitry with system time. It can be appreciated in light of the above discussion that it is important that the internal time of the mobile be synchronized with the system time. This enables the mobile to know where in the PN code sequence the base station is and enables communication between the base station and the mobile. Accordingly, when the mobile is in communication with a base station, the base station transmits system time to the mobile to facilitate synchronization.

In a spread spectrum communication system, a pilot signal is used to synchronize a mobile station in phase and frequency to the transmissions of a base station. In the exemplary embodiment, the spread spectrum communication system is a direct-sequence spread spectrum communication system. Examples of such systems are discussed in U.S. Pat. No. 5,056,109, issued Mar. 3, 1992, entitled "METHOD AND APPARATUS FOR CONTROLLING TRANSMISSION POWER IN A CDMA MOBILE TELEPHONE SYSTEM," and U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM," both of which are assigned to the assignee of the present invention and incorporated by reference herein. In a direct-sequence spread spectrum communication system, the transmitted signals are spread over a frequency band greater than the minimum bandwidth necessary to transmit the information by modulating a carrier wave by the data signal, then modulating the resulting signal again with a wideband spreading signal. In a pilot signal of one embodiment, the data can be looked at as an all ones sequence. A linear feedback shift register, the implementation of which is described in detail in the aforementioned patents, typically generates the spreading signal. The spreading signal can be viewed as a rotating phasor of the form:

$$s(t)=Ae^{-\omega t+\phi}$$

In order to acquire a base station, a mobile must synchronize to the received signals from the base station in both phase, $\phi$, and in frequency, $\omega$. A searcher finds the phase of the received signal, $\phi$. After finding the phase of the spreading signal, $\phi$, the frequency is found by using a demodulation element that has hardware for both phase and frequency tracking. The method by which the mobile finds the phase of the received signal is by testing a set of phase hypotheses, discussed in terms of the search window above, and determines if one of the hypothetical phase hypotheses, also referred to as offset hypotheses, is correct. An example of a searcher operating using "window" searches is given in copending U.S. Pat. No. 5,805,648, filed Sep. 8, 1998 and entitled "METHOD AND APPARATUS FOR PERFORMING SEARCH ACQUISITION IN A CDMA COMMUNICATION SYSTEM," assigned to the assignee of the present invention and incorporated herein by reference.

To allow for the handoff of a call, the wireless system uses so-called "slotted" searching. In other words, a mobile performing slotted searching is assigned periodic windows (referred to as "slots") to search for other bases stations to which it might handoff a call. Accordingly, mobiles search for pilot channel signals transmitted by surrounding bases stations in a predetermined window centered about the location in the PN code sequence at which the mobile expects the pilot channel to be, in accordance with standards set forth above. The base station that the mobile is currently communicating may send a search window size and other parameters, such as system time, to the mobile. As the skilled artisan will readily appreciate, this reacquisition search window should be small as possible to avoid prolonged searching, but sufficiently large enough to account for typical internal clock errors. Further, the search parameters should be as particularized as possible.

In an exemplary embodiment, the present invention may reduce the search window size for PN1 shown in FIG. 1 by relative to currently known standard methods. As shown in FIG. 1, where the location of the mobile station is known to be within a circle of radius r, a search may be centered around d1–d2 with a search size of ±2r. A typical value for "r" is 100 meters. In this example, a circle is used to represent any "position uncertainty" region for a mobile. However, ellipses, squares, and rectangles may also be used to represent these "position uncertainty" regions.

Further, if the mobile is at point C, the search window for PN1 could be reduced by a factor of 3R/4r, where R is the radius of the cell and r is the radius of the location uncertainty region. In one embodiment, the invention accomplishes this by using the physical location of the mobile to particularize the search window size. In another embodiment, the invention uses the location to particularize all of the search parameters.

To perform the method, the approximate location of the mobile must be known. This location may be determined in various ways known in the art and mentioned above. A discussion of one exemplary mobile location determination technique is discussed in co-pending U.S. patent application Ser. No. 09/040,501 entitled "SYSTEM AND METHOD FOR DETERMINING THE POSITION OF A WIRELESS CDMA TRANSCEIVER," filed Mar. 17, 1998, assigned to the assignee of the present invention and incorporated by reference herein. For purposes of the present invention, a precise position determination is not necessary. Course techniques may be used to determine the mobile's location.

Once the mobile is in control of a traffic channel, the base station that is currently handling the communication transmits a message telling the mobile the size of the search windows to be used for searching for the pilot signals contained in the neighbor set. The search window sizes are determined considering the mobile location within the serving cell. For example, and referring to Table 1 and FIG. 1, the search window for PN1 may be reduced from 12 to 4, reducing the window size from 160 chips to 14 chips, for a mobile located at position B. And because the search window size is reduced, demodulation expenses are reduced, and searches are completed expeditiously.

The searcher window size has at least two components, one component related to the geometric distance between the phone and the targeted pilot, and another related to multipath effects for a transmitted pilot signal. Accordingly, combining the effects of the two components minimizes selected search window size. In CDMA systems, space or path diversity is obtained by providing multiple signal paths through simultaneous links from a mobile through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

In another embodiment, the search parameters may also be chosen based upon the location of the mobile. When the mobile is in control of the traffic channel, a base station will transmit search parameters to the mobile. These search parameters utilize knowledge of the location of the mobile to particularize or "customize" the search parameters. This particularizing is used to optimize searcher procedures. Optimizing search window size and the procedures used by the searcher to perform the search results in reduced search times.

In yet another embodiment, once the window size has been determined corresponding to geographical areas in a cell, the window sizes are stored in a memory unit. Searcher procedure parameters may also be stored. Assuming that the cells in the wireless system remain substantially unchanged, these window sizes may be communicated to and used by any mobile that is located within the geographical area. The base station controller, knowing the location of a mobile, can look up the window size and/or the searcher procedure parameters and transmit them to the mobile. In another embodiment, the mobile may store the information.

Apparatus Components and Interconnections

Various apparatus embodiments are discussed below in relation to particular mobile location systems and supporting hardware embodiments. However, those schooled in the art will recognize that various location systems may be used.

Figure 2A:
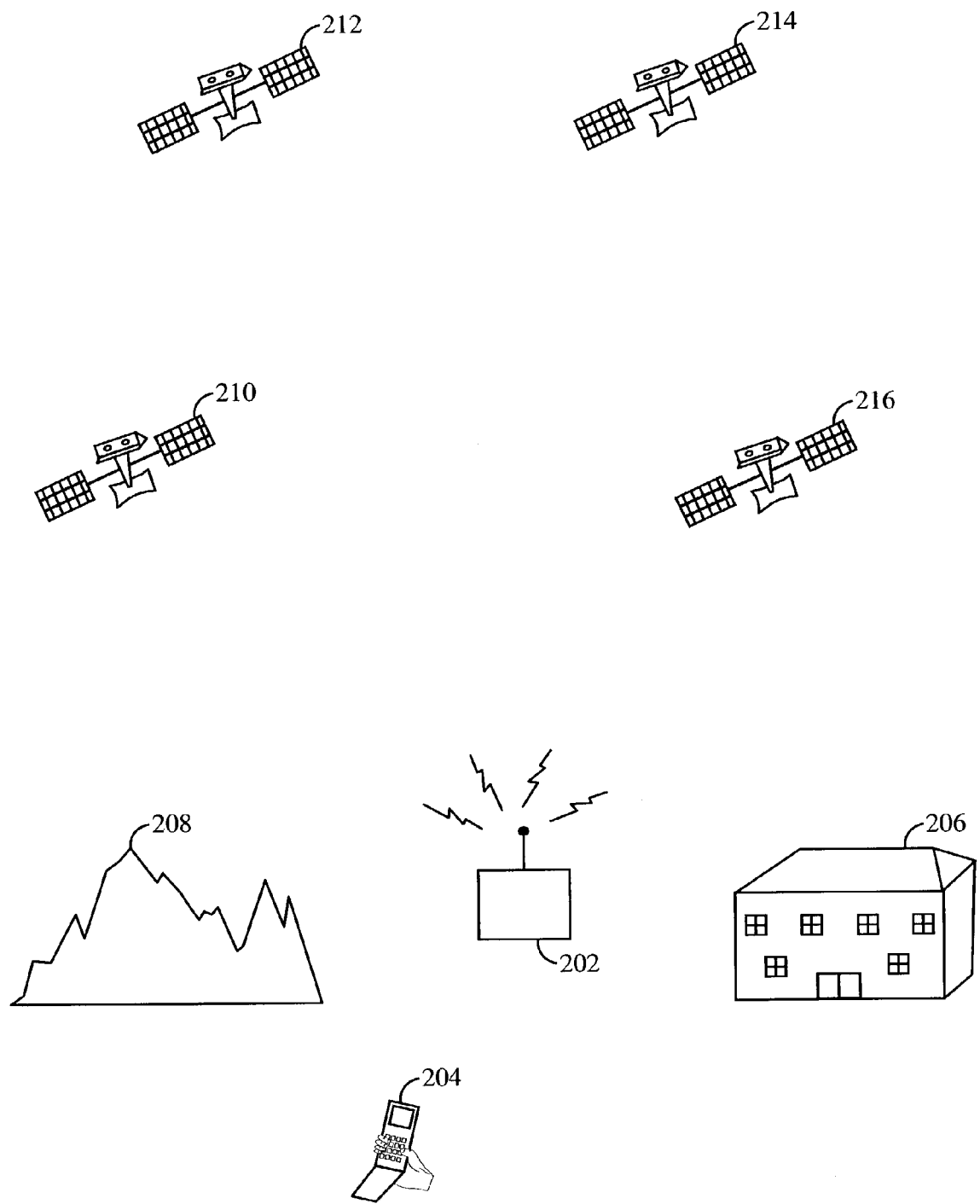
FIG. 2a illustrates a wireless communications apparatus utilizing a satellite positioning system in accordance with the invention.

FIG. 2(a) is a diagram showing an implementation of a base station 202 and a mobile 204 in a synchronous CDMA communication network. The network is surrounded by buildings 206 and ground based obstacles 208. Base station 202 and mobile 204 are disposed in a GPS environment having several GPS satellites, of which four are shown 210, 212, 214 and 216. Such GPS environments are well known; for example, see for example Hofmann-Wellenhof, B., et al., GPS Theory and Practice, Second Edition, New York, N.Y.: Springer-Verlag Wien, 1993. In a typical prior art GPS application, at least four satellites are required in order for a GPS receiver to determine its position. In contrast, the position of the remote station 204 may be determined using signals from as few as one GPS satellite and, in the simplest case, two other terrestrial based signals.

Figure 2B:
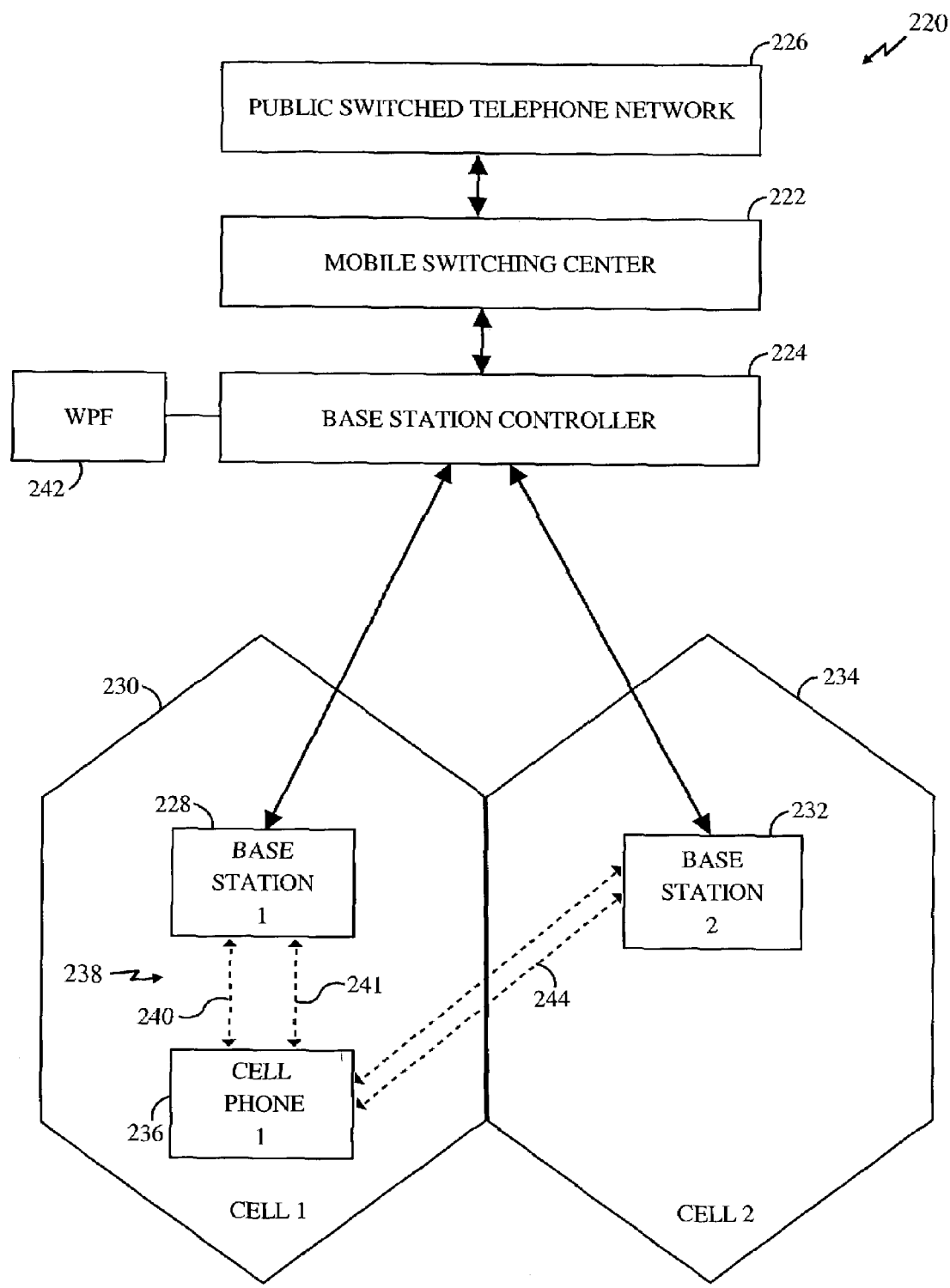
FIG. 2b shows a wireless communications network in accordance with the invention.

FIG. 2(b) shows a block diagram of a CDMA network 220. The network 220 includes a mobile switching center (MSC) 222 having a base station controller (BSC) 224. A public switched telephone network (PSTN) 226 routes calls from traditional terrestrial based telephone lines and other networks (not shown) to and from MSC 222. MSC 222 routes calls from PSTN 226 to and from a source base station 228 associated with a first cell 230 and a target base station 232 associated with a second cell 234. In addition, MSC 222 routes calls between the base stations 228 and 232. The source base station 228 directs calls to the first mobile 236 within the first cell 230 via a first communications path 238. The first communications path 238 is a two-way link having a forward link 240 and a reverse link 242. Typically, when the base station 228 has established communications with the mobile 236, the forward link 240 includes a traffic channel.

A wireless positioning function (WPF) 242 is shown communicatively coupled to BSC 224, but may be coupled directly or in-directly to other network elements such as MSC 222. WPF 242 generally comprises a digital processing device, storage, and other elements (all not shown) commonly found in such devices. WPF 242 may be put to a variety of uses, such as estimating the one-way time delay for a signal sent between the base station 228 and the mobile 236, or monitoring and accounting for the time offset between a reference time and a time of arrival of a signal.

Although each base station 228 and 232 is associated with only one cell, a base station controller often governs or is associated with base stations in several cells. When mobile 236 moves from first cell 230 to second cell 234, mobile 236 begins communicating with the base station associated with the second cell. This is commonly referred to as a "hand-off" to target base station 232. In a "soft" handoff, mobile 236 establishes a second communications link 244 with target base station 232 in addition to first communications link 238 with source base station 228. After mobile 236 crosses into second cell 234 and the channels with the second cell has been established, the remote station may drop first communications link 238.

In a hard handoff, the operation of source base station 228 and target base station 232 typically are different enough that communications link 244 between the source base station must be dropped before the link to the target base station can be established. For example, when a source base station is within a CDMA system using a first frequency band and target base station is in a second CDMA system using a second frequency band, the remote station will not be able to maintain links to both base stations concurrently, since most remote stations do not have the ability to tune to two different frequency bands concurrently. When first mobile 236 moves from the first cell 230 to second cell 234, link 238 to source base station 228 is dropped and a new link is formed with target base station 232.

Figure 3:
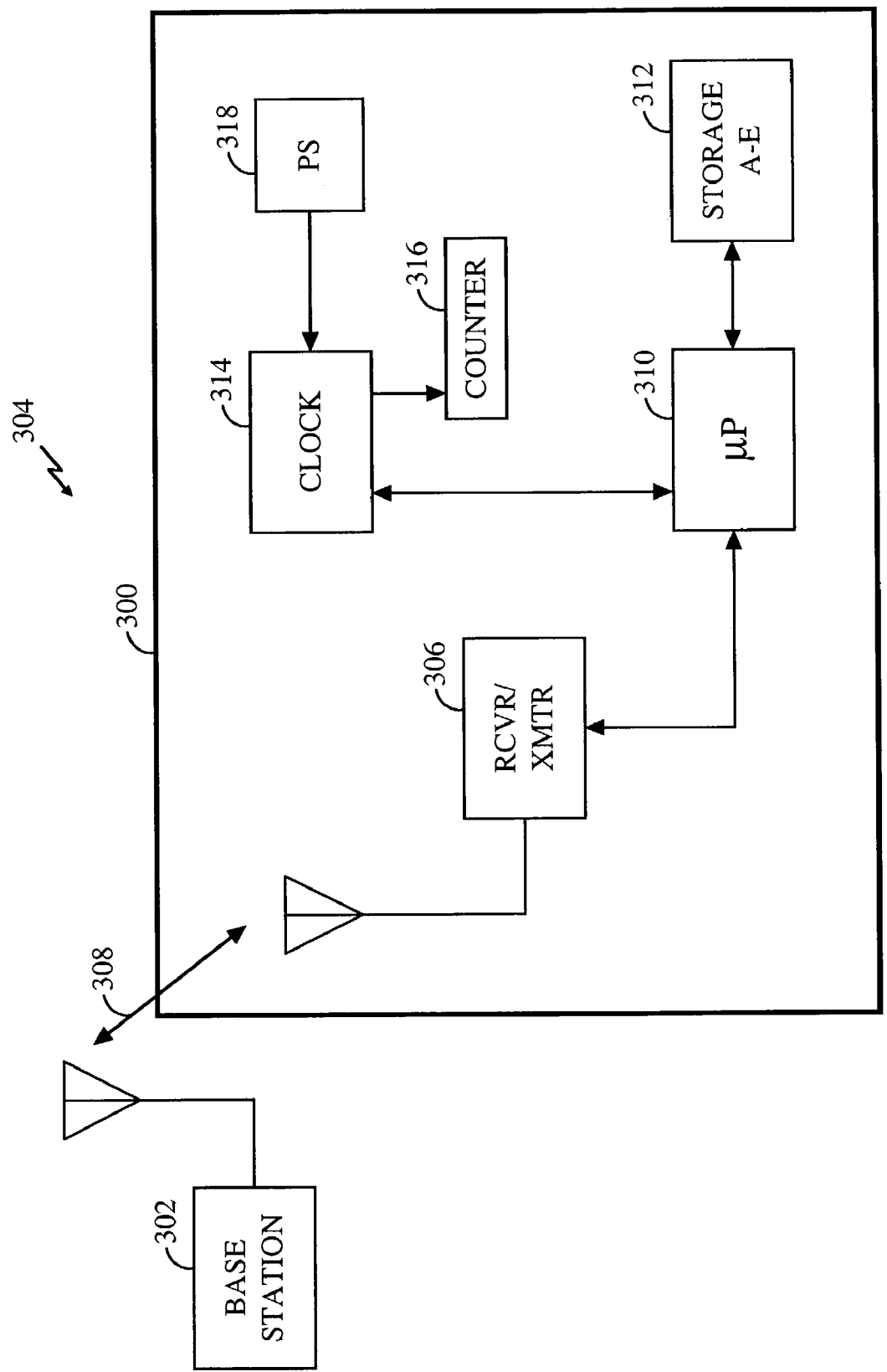
FIG. 3 shows a block diagram of a mobile in accordance with the invention.
Figure 4:
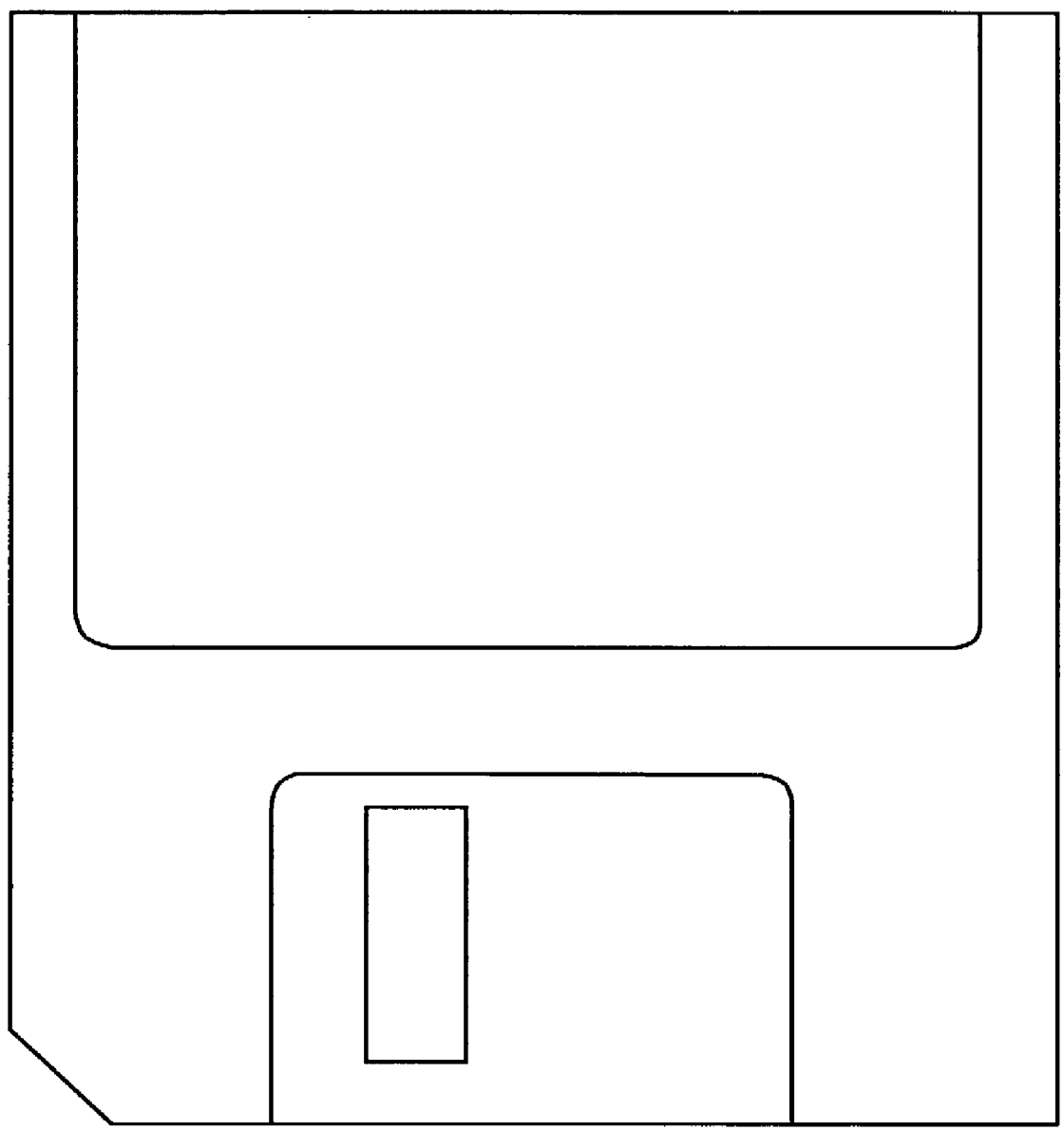
FIG. 4 illustrates an exemplary example of an article of manufacture in accordance with the invention.

Turning to FIG. 3, a mobile 300 is shown in wireless communication with a base station 302 of a wireless communication system, generally designated 304. It is to be understood that although a single base station 302 and a single mobile 300 are shown in FIG. 3 for clarity of disclosure, the system 304 would typically include other mobiles and base stations (not shown). In an exemplary embodiment, the system 304 implements code division multiple access (CDMA) principles to discriminate one mobile signal from another. Details of a preferred CDMA system are set forth in the above referenced U.S. Pat. No. 4,901,307, issued Feb. 13, 1990 and entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein. As shown in the figure, mobile 300 includes a receiver/transmitter 306 that can communicate with base station 302 via a wireless link 308. Further, mobile 300 includes control circuitry for controlling the reception and transmission of data by receiver/transmitter 306. In FIG. 3, this control circuitry is rendered, for simplicity, as a digital signal processor 310. As also shown, processor 310 can access a data storage device 312. Although not shown, base station 302 may also house digital signal processing equipment and storage. As more fully disclosed below, data storage device 312 contains instructions that are executable by the digital signal processor 310. Accordingly, with the exception of the logical structure of data storage device 312, mobile 300 preferably is a CDMA mobile as is known in the art.

Additionally, mobile 300 includes an internal clock 314. In one embodiment, internal clock 314 is a voltage controlled temperature controlled crystal oscillator (VCTCXO). However, it should be noted that other clock devices, whether or not crystal-based, are equally suitable for use with the present invention. Accordingly, the output signal of clock 314 is a sequence of clocking pulses that are sent to a counter 316, with the rate of clocking pulse output being controlled by controlling the voltage of an input signal to clock 314 from a clock power supply 318 in accordance with well-known principles. Clock 314 may be synchronized with system time by the receipt of a timing message from base station 302 as discussed above.

Article of Manufacture

The methods as described above may be implemented, for example, by operating a digital signal processing unit to execute a sequence of machine-readable instructions. These instructions may reside in various types of signal bearing media. In this respect, one aspect of the present invention concerns an article of manufacture comprising a signal bearing media tangible embodying a program of machine-readable instructions executable by a digital signal processing unit to perform a method to reduce the time needed to perform a pilot search.

This digital signal bearing medium may comprise, for example, RAM or an ASIC (neither shown) contained in a communications network. Alternatively, the instructions may be contained in another signal bearing medium, such as a magnetic data storage medium, directly or indirectly accessible to the digital signal processing unit. In an illustrative embodiment of the invention, the machine-readable instructions may comprise lines of compiled computer code, such as C, C++, or Java, or other suitable coding language commonly used by those skilled in the programming arts.

Other Embodiments

While there have been shown what are presently considered to be exemplary embodiments of the invention, it will be apparent to those skilled in the art that various changes and modifications can be made without departing from the scope of the invention as defined by the appended claims.

What is claimed is:

1. A method for conducting a pilot signal search in a wireless communications network, comprising:
   determining the location of a mobile station within the network;
   utilizing said location of said mobile station, search window sizes, and parameter information to minimize the search time required for searching all the pilots identified in a pilot set; and
   searching for all pilots in said pilot set.

2. The method in accordance with claim 1, wherein the location of the mobile station is tracked within the communications network.

3. The method in accordance with claim 1, further comprising the step of:
   utilizing signal multipath effects in conjunction with said location of said mobile station to determine search window sizes.

4. The method in accordance with claim 3, further comprising the steps of:
   storing search window sizes relative to the respective location of the mobile station within a cell; and
   determining search parameters using the stored search window size for a known location of a mobile station.

5. The method in accordance with claim 4, wherein the stored location of the mobile station is stored in a three dimensional table.

6. An article of manufacture embodying a program of machine-readable instructions executable by a digital signal processing apparatus to perform a method for conducting a pilot signal search in a wireless communications network, said readable instructions comprising:
   determining the location of a mobile station within the network; utilizing said location of said mobile station, search window sizes, and parameter information to minimize the search time required for searching all the pilots identified in a pilot set; and
   searching for all pilots in said pilot set.

7. The article of manufacture in accordance with claim 6, the readable instructions further comprising:
   utilizing signal multipath effects in conjunction with said location of said mobile station to determine search window sizes.

8. The article of manufacture in accordance with claim 7, further comprising:
   storing search window sizes relative to the respective location of the mobile station within a cell; and
   determining search parameters using the stored search window size for a known location of a mobile station.

9. An apparatus for conducting a pilot signal search in a wireless communications network, comprising:
   at least one base station including a first digital signal processing unit, wherein said at least one base station transmits a pilot signal, and wherein said first digital signal processing unit can be used in determining the location of a mobile station within the communications network;
   at least one mobile station including a second digital signal processing unit, wherein the at least one mobile station is communicatively coupled with the at least one base station, and wherein the second digital signal processing unit can use the location of a mobile station, search window sizes, and parameter information to minimize the search time required for searching all pilot signals identified in a pilot set.

10. The apparatus in accordance with claim 9, wherein a selected base station of the at least one base stations communicates the search window size and parameter information using a traffic channel to the at least one mobile station.

11. An apparatus for conducting a pilot signal search in a wireless communications network, comprising:
   a first means for determining the location of a mobile station within the communications network; and
   a second means, communicatively coupled with said first means, for using the location of the mobile station, search window sizes, and parameter information to minimize the search time required for searching all pilot signals identified in a pilot set.

* * * * *